(12) United States Patent
Skjæveland

(10) Patent No.: US 12,061,303 B2
(45) Date of Patent: Aug. 13, 2024

(54) METHOD OF ANALYSING SEISMIC DATA

(71) Applicant: EQUINOR ENERGY AS, Stavanger (NO)

(72) Inventor: Øyvind Skjæveland, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 332 days.

(21) Appl. No.: 17/604,854

(22) PCT Filed: Apr. 29, 2020

(86) PCT No.: PCT/NO2020/050110
§ 371 (c)(1),
(2) Date: Oct. 19, 2021

(87) PCT Pub. No.: WO2020/226506
PCT Pub. Date: Nov. 12, 2020

(65) Prior Publication Data
US 2022/0221604 A1   Jul. 14, 2022

(30) Foreign Application Priority Data

May 3, 2019   (GB) ..................................... 1906256

(51) Int. Cl.
*E21B 49/08*   (2006.01)
*G01V 1/28*   (2006.01)
(Continued)

(52) U.S. Cl.
CPC ............ *G01V 1/302* (2013.01); *E21B 49/087* (2013.01); *G01V 20/00* (2024.01);
(Continued)

(58) Field of Classification Search
CPC .......... G01V 1/302; G01V 1/301; G01V 1/30; G01V 1/282; G01V 1/28; G01V 11/00;
(Continued)

(56) References Cited

U.S. PATENT DOCUMENTS 5,056,066 A * 10/1991 Howard .................... G01V 1/30
367/72
9,857,490 B2 * 1/2018 Martinez ................ G01V 1/362
(Continued)

FOREIGN PATENT DOCUMENTS

GB   2 400 664 A   10/2004
GB   2 429 526 A    2/2007
(Continued)

OTHER PUBLICATIONS

International Search Report and Written Opinion, PCT/NO2020/050110, dated Jun. 29, 2020 (8 pp.).
(Continued)

*Primary Examiner* — Jeffrey P Aiello
(74) *Attorney, Agent, or Firm* — Eversheds Sutherland (US) LLP

(57) ABSTRACT

A method of analysing seismic data from a geological structure. The method includes determining a set of tiles from a data cube of seismic data and determining which tiles of the set of tiles can be grouped into one or more patches of tiles.

16 Claims, 11 Drawing Sheets

(51) Int. Cl.
  *G01V 1/30* (2006.01)
  *G01V 20/00* (2024.01)
  *G01V 99/00* (2024.01)

(52) U.S. Cl.
  CPC ....... *E21B 2200/20* (2020.05); *E21B 2200/22* (2020.05); *G01V 2210/641* (2013.01); *G01V 2210/642* (2013.01)

(58) Field of Classification Search
  CPC ........ G01V 1/345; G01V 1/364; G01V 1/306; G01V 1/34; G01V 1/32; G01V 1/303; G01V 1/50; G01V 99/005; G01V 2210/66; G01V 2210/64; G01V 2210/63; G01V 2210/74; G01V 2210/641; G01V 2210/642; G01V 2210/643; E21B 2200/22; E21B 2200/20; E21B 49/087; E21B 49/00; G06F 17/18; G06F 17/10; G06N 3/08; G06N 20/00
  USPC ..... 73/1.85; 166/250.01; 367/73, 38, 14, 72, 367/53, 59, 68; 382/109, 100; 702/14, 702/16, 17, 13, 6, 11, 2, 18, 9, 5, 150, 1, 702/179, 152; 703/2, 10
  See application file for complete search history.

(56) References Cited

U.S. PATENT DOCUMENTS 11,454,734 B2 *  9/2022  Nguyen ................. G01V 1/307
2002/0126896 A1  9/2002  Pedersen

FOREIGN PATENT DOCUMENTS

| GB | 2429526 A * | 2/2007 | ............ G01V 1/301 |
| WO | 2009/142872 A1 | 11/2009 | |
| WO | 2011/062807 A1 | 5/2011 | |
| WO | WO-2011062807 A1 * | 5/2011 | ............... G01V 1/32 |
| WO | 2013/039953 A1 | 3/2013 | |

OTHER PUBLICATIONS

Search Report, GB1906256.1, dated Oct. 30, 2019 (6 pp.).
Examination Report, GB1906256/1, dated Jul. 26, 2021 (3 pp.).

* cited by examiner (a)

(b)

(c)

(d)

(e)

(a)

(b)

METHOD OF ANALYSING SEISMIC DATA

TECHNICAL FIELD

The present invention relates to the field of seismic data analysis. In particular, it relates to a method of analysing seismic data for use when prospecting for hydrocarbons, for example.

BACKGROUND OF THE INVENTION

Seismic data representing a subterranean structure can be analysed to identify features such as faults, flatspots, unconformities and the like, to create a model of the subterranean structure. Such a model can be useful for identifying possible locations of hydrocarbons and/or for deciding where/how/whether to drill for them.

Seismic data is typically provided in the form of a seismic data cube, i.e. a cube (three-dimensional block) of numbers which represent the amplitudes of individual traces. Due to the nature of this data format, the seismic data is typically analysed manually, i.e. by a human interpreter viewing the data on a two-dimensional display, with higher amplitudes shown with darker colours, for example, such as in FIG. 8. From such a display, a human interpreter can then, by eye, identify reflector surfaces and features such as faults, flatspots, unconformities and the like. Such features can then be stored in a database by identifying their position. However, this analysis requires a human interpreter and developing software or logic to directly analyse the seismic data cube would be a complicated and lengthy process.

There is therefore a need for an improved method of analysing seismic data which can, for example, at least partially be performed by a computer.

SUMMARY OF THE INVENTION

According to a first aspect of the invention, there is provided a method of analysing seismic data from a geological structure, the method comprising:
 determining a set of tiles from a data cube of seismic data; and
 determining which tiles of the set of tiles can be grouped into one or more patches of tiles.

As such, the method involves determining or identifying tiles from the seismic data and then grouping tiles, where possible, into one or more patches, as determined by the method. By identifying tiles in the seismic data, and then forming patches from the tiles, this allows the seismic data to be much more easily analysed, e.g. by a computer, than in prior art methods where patches of tiles are not identified from the seismic data.

The seismic data is preferably provided in the form of a seismic data cube. A seismic data cube contains seismic data (e.g. amplitude data) typically as a function of three dimensions, usually two spatial dimensions corresponding to a horizontal position, and one time dimension corresponding to a depth (with greater time corresponding to greater depth). Although the term "cube" is used, the three dimensions of the data cube need not necessarily be the same.

A tile is a two-dimensional portion of the seismic data cube, the tile preferably having two spatial dimensions corresponding to horizontal position. The tile may be horizontal or it may be inclined (i.e. have a "dip"). The tile may be flat. However, it need not necessarily be flat and in some cases it may be curved or uneven.

A tile may be any shape including square, rectangular, hexagonal, octagonal, polygonal, circular, elliptical or irregular.

Preferably, all of the tiles in the set of tiles have the same (constant) size and/or shape, and more preferably both the same (constant) size and shape.

In some embodiments, rectangular tiles (of a preferably constant size and/or shape) are used. Rectangular tiles can be implemented in a relatively simple way. However, traces at the corners of the rectangles (rectangular tiles) are at a larger distance from the tile centre compared to other traces and this may represent or result in an improper sampling. This may result in rectangular tiles giving rise to artefacts such as local maxima that are (purely) an effect of the tile shape/size, and thus "false", e.g. when the dip of the tile is such that a sum picks up maximum energy of the "side lobes" of the main event. Nevertheless, such artefacts may be suppressed, for example by (introducing a (taper) function) giving different weights to traces as function of their local position within a tile. For example, traces further from a tile centre point may be given a lower weight than tiles closer to the centre point. With other tile shapes (e.g. circular, octagonal, hexagonal, elliptical), such artefacts may not be observed or may be naturally suppressed due to the tile shape.

Preferably, there is a constant or regular spacing between (e.g. a centre point of) each of the tiles in the set of tiles. As such, the centre points of the tiles in the set of tiles preferably form a regular grid with constant or regular spacings, at least in one (e.g. lateral) direction. For example, the centre points of the tiles in the set of tiles may have constant (but possibly different) spacings in one, two or three of three orthogonal directions. For example, a vertical spacing between tiles (or their centre points) may be the same as or different to a horizontal spacing between tiles (or their centre points). Preferably, at least a/the horizontal spacing(s) between tiles (or their centre points) is constant.

The seismic data, e.g. from which the seismic data cube is formed, may comprise pre-stack seismic data or stacked seismic data (e.g. the near, mid, far, lithology or fluid stack, for example).

The seismic data could be old or "legacy" seismic data, e.g. which may have previously been analysed using a different method. Alternatively it could be new seismic data which has not been analysed before. The seismic data could be seismic data obtained, for example, using a standard or known method of AVO seismic data acquisition (e.g. as described below).

The method preferably comprises obtaining the seismic data from a memory (e.g. a memory of a computer) or acquiring the seismic data with at least one seismic source and at least one seismic receiver array (e.g. as is known in the art).

The geological structure may be any geological structure (e.g. subsurface or subterranean structure of the Earth) from which it is desired to acquire seismic data to study and/or model its structure.

The data tiles in the set of data tiles are preferably determined by identifying local maxima (e.g. of seismic amplitude). In a preferred embodiment, the tiles are determined using a radon transform, which may be applied on, e.g. subsets of, the data cube. For example, a windowed three-dimensional linear Radon transform may be applied. As such, the tiles, or at least some of the tiles, may represent a reflector surface (or (small) parts of a reflector surface) in the geological structure.

The tiles may be identified in the following way. First, a sub-cube may be defined (selected) with the lateral size of a tile. A tile candidate in that sub-cube may be selected, the tile candidate having an associated depth and dip (gradient) (which may be zero, i.e. horizontal, or non-zero, i.e. inclined). All of the traces in the sub-cube are then preferably summed into a single trace along the dip. This may be repeated for all tile candidates in the sub-cube (i.e. all dips and depths). A tile candidate may be confirmed as a tile (i.e. corresponding to a possible reflector) if the sum shows a local amplitude maximum with respect to depth and dips. If confirmed as a tile, the tile may be stored, e.g. in a table, in memory.

For example, the method may be performed on or by a computer and the memory may be a memory provided in (or connected to/accessible by) that computer.

Each data tile in the set of data tiles preferably comprises or corresponds to a lateral area of equal to or more than 40 or 49 or preferably more than 400 seismic traces. A data tile may, for example, contain up to 100,000 traces. In a preferred embodiment, each data tile contains 51×51=2601 traces. Such tiles would contain sufficient data to be able to provide a meaningful and useful result. However, they are still small enough to be able to provide a "local" result.

The distance between adjacent traces in a data cube is typically around 12.5 m. However, it could be 6.25 m or 18.75 m or up to 25 m. As such, a tile with 51×51 traces would typically correspond to an area of 625×625 m or 0.4 km$^2$. A tile with 7×7 (i.e. 49) traces may have an area of 0.007 km$^2$. Tiles may contain traces corresponding to an area of up to 4 km$^2$, for example when detecting flatspots. However, the geological structure of the subsurface is not usually planar at this scale. Therefore a tile size from around 0.005 km$^2$ to around 5 km$^2$ may be preferred and should be a sensible range.

The tiles may be rectangular or square (e.g. corresponding to a rectangular or square array of traces). If so, they preferably comprise an odd number of traces along each edge. This can ensure that there is a trace in the centre position of each tile, which can be beneficial. However, the tiles do not need to be rectangular, and could be circular, elliptical or irregular in shape, for example.

The data tiles in the set of data tiles may be determined by identifying data tiles which correspond to a reflector surface, for example as described in GB 2429526 A.

Preferably, the data tiles are defined in such a way that multiple tiles with different orientations (dips) may (e.g. are permitted to) exist at the same position.

Preferably, the defined tiles have at least 50% overlap with adjacent tiles and, in some embodiments, close to 100% overlap. For example, in the case of rectangular or square tiles, all but one (or more) column or row of traces may be contained in the next tile along, e.g. in a series or array of tiles. Using such an overlap can help to provide more accurate identification of possible fluid contacts.

Tiles are preferably identified and stored in memory (e.g. as described above) by/with their position (e.g. in the seismic data cube) and/or dip, and preferably both. For example, a tile may be identified and stored in memory by storing its position (e.g. three coordinates defining a point such as a centre or corner point of the tile) and dip (e.g. two values representing its dip or slope/gradient in two, preferably orthogonal, horizontal directions). A size of the tile may be stored, e.g. and in particular if tiles of varying size are used.

Once the tiles have been identified or determined, the method involves determining (identifying) which tiles of the set of tiles can be grouped into one or more patches of tiles. A patch of tiles preferably comprises two or more tiles which line up with each other, preferably within a predefined tolerance or limit. For example, a patch of tiles may comprise two or more tiles which are located in a common surface, e.g. within a predefined tolerance or limit. The tiles forming a patch are preferably adjacent to each other and/or overlapping.

Determining which tiles of the set of tiles can be grouped into one or more patches of tiles may comprise applying one or more rules or methods, such as testing whether the tiles line up with each other, preferably within a predefined tolerance or limit, and/or whether the tiles are located in a common surface, e.g. within a predefined tolerance or limit. The one or more rules may require that the tiles forming a patch are adjacent to each other and/or overlapping.

Testing whether the tiles line up with each other, preferably within a predefined tolerance or limit, may comprise determining a measure of a pair of tiles' collinearity and/or coplanarity (i.e. how collinear and/or coplanar the tiles are), e.g. by projecting the tiles into one or more common planes.

In a preferred method, only neighbouring tiles are tested to determine whether or not they can be grouped into a common patch.

A preferred method comprises finding or determining a midpoint between a pair of tiles being tested. This may be a midpoint on a line between the centres of the two tiles.

The method may comprise projecting each of the pair of tiles onto one or two axes (e.g. the XL and/or IL axes).

If the tiles point perfectly at each other (e.g. are collinear and/or co-planar), then two projections will be the same.

The method may comprise calculating the difference between the projections. In one embodiment, the difference may be calculated by determining a maximum time difference between the two projections. This is bound to be on the edge in cases where rectangular tiles are used. However, in other embodiments, other measurements of the difference may be used.

This particular measurement is commutative, which is important as it is well-defined and independent from starting point.

The method may then assess whether the difference is within a predefined tolerance (e.g. less than a maximum tolerance value). The tolerance value applied may depend on one or more factors such as the difference measurement used, the size of the tiles, and/or the size of any overlap or gap between the tiles. In some cases, a tolerance value of between 1 and 5 ms is applied. If a gap between the tiles is relatively large, then this may mean that a larger tolerance value may be applied. If an overlap between the tiles is relatively large, then this may mean that a smaller tolerance value may be applied.

If the difference is not within a predefined tolerance, then the two tiles may be identified as not being part of a common patch.

If the difference is within a predefined tolerance, then the two tiles may be identified as being part of a common patch. Alternatively, or additionally, one or more further checks may be performed, e.g. before such an identification is made and/or to confirm or refute this identification.

For example, the method may comprise checking whether there is one and only one match (i.e. tile identified as being part of a common patch with another tile) within the tolerance. If there is only one match, then the pairs of tiles may be identified (or confirmed as being identified) as being part of a common patch. On the other hand, if there are two or more matches (i.e. two or more tiles are identified as being part of a common patch with a tile), then the tiles are identified as not being part of a common patch (or not identified as being part of a common patch). This check can help to ensure that the patches are well-defined. A patch of tiles may (and preferably does) correspond to a reflector surface in the geological structure.

The method preferably comprises storing data defining the one or more patches in a memory (or memories) (e.g. as described above). The data defining the one or more patches preferably comprises data identifying the tiles comprised by each of the one or more patches. As such, a patch may be an object defined by the tiles from which it is composed.

The method may comprise displaying the tiles and/or patches on a display, for example as lines in two dimensions.

The method preferably further comprises analysing at least one tile from the set of tiles and/or the one or more patches of tiles to identify one or more geological features or other features of a geological structure.

In some cases, a single tile may be analysed to identify one or more geological features or other features of a geological structure.

In some cases, both a single tile or two or more tiles, and the one or more patches of tiles may be analysed (e.g. together) to identify one or more geological features or other features of a geological structure.

Analysing at least one tile (e.g. a single tile or two or more tiles) may comprises analysing attributes of a tile such as amplitude, e.g. mean amplitude over the tile, and statistical variables related to the amplitude over the tile. As such, data (e.g. tile-related attributes) other than data stored in and obtained directly from a seismic data cube may be used to identify one or more geological features or other features of a geological structure.

Analysing one or more patches of tiles to identify one or more geological features or other features of a geological structure, e.g. with a geometrical analysis related, for example, to how a patch relates, e.g. geometrically, to one or more other patches, can allow geological features to be identified.

In a preferred embodiment, a combined analysis of both one or more tiles and the one or more patches of tiles is performed to identify one or more geological features or other features of a geological structure.

For example, the method may comprise analysing the one or more patches of tiles to identify one or more of an unconformity, a pinchout, a flatspot, multiples and/or a fault. The step of analysing the one or more patches of tiles to identify geological features or other features of a geological structure is preferably performed by applying logic (or "recipes"). For example, the logic or recipes may be based on known arrangements of reflectors in such cases, e.g. whether patches are parallel or not, their termination points or edges, and whether the patches cross other patches or not. The logic may be based on the locations, orientations and/or termination points or edges of patches. The logic or recipes are preferably provided in the form of one or more algorithms or software.

Alternatively (or additionally), the step of analysing the one or more patches of tiles to identify geological features or other features of a geological structure may be performed by a user and/or using machine learning.

If a patch or group of patches is identified as corresponding to a geological feature or other feature of a geological structure, then that geological feature or other feature of a geological structure is preferably stored as an object in a memory (e.g. as described above). The object may be defined by the patches and/or tiles from which it is composed or by which it is defined. Thus, the object may be stored in memory by storing pointers to the patches and/or tiles from which it is composed or by which it is defined.

Preferably, the one or more patches are only analysed if they comprise greater than a predetermined number of tiles. This can help to avoid unnecessary or not useful analysis of very small patches.

The method preferably further comprises displaying the geological features or other features of a geological structure on a display. This can help a user to visualise and/or check the results of the analysis.

In an embodiment, a user may select whether to display any or all of the tiles, patches and/or geological features or other features of a geological structure (other objects) on a display. A user may, for example, select a tile, patch and/or other object to display further data or information about that tile, patch and/or other object. A user may use such an interactive display, for example, to add further data to any patch and/or other object.

The method preferably comprises storing instructions (e.g. a recipe or logic) for defining the identified geological features and/or other features of a geological structure, e.g. from the set of tiles, in a memory (e.g. as described above). As such, the identified geological features and/or other features of a geological structure need not necessarily be stored but simply the instructions for defining them from, for example, the set of tiles.

In a further aspect, there is provided a method of modelling a geological structure using seismic data, the method comprising performing the method described above, i.e. to model the geological structure.

In either of the above aspects, the method may further comprise determining a possible location of hydrocarbons. For example, such a location may be determined based on the location of a geological feature identified from one or more patches. In one example, the identification of a flatspot may indicate a possible lower boundary of a hydrocarbon reservoir. Another example is identifying one or more patches that define a surface that, if it happens to represent the transition from a layer relatively impermeable to hydrocarbon such as shale, to a layer relatively permeable to hydrocarbons, such as sandstone, could act as a barrier for an accumulation of hydrocarbons, e.g. that the geometry of the surface is an anticline.

The method preferably further comprises outputting and/or storing (e.g. to a screen (e.g. a screen connected to, or which is part of, a computer on which the method is performed) and/or memory (e.g. as described above)) a set of locations corresponding to possible locations of hydrocarbons (e.g. preferably location(s) of fluid contacts) as determined by the method.

The probability or a measure of the likelihood of each location corresponding to a fluid contact may also be output and/or stored. This could be (e.g. partially) based on a data quality indicator, for example.

The output of the method, e.g. the output set of locations, preferably with a probability or a measure of the likelihood of each location corresponding to a fluid contact, may be used as a basis (optionally in combination with other data that may be available) for deciding whether or not to drill for hydrocarbons at the output set of locations (e.g. at a location within the output set of locations).

In some cases, the method may further comprise drilling for hydrocarbons at at least one of, or at a location within, the output set of locations (e.g. within a region at least partly defined by the output set of locations), as determined by the method. For example, the method may comprise installing a drill (e.g. at least one drill) arranged to drill for hydrocarbons at at least one of, or at a location within, the output set of locations (e.g. within a region at least partly defined by the output set of locations), as determined by the method, and then preferably using (controlling) the drill to drill for hydrocarbons (or check for the presence of hydrocarbons) at that location. The drill may be moved to drill for hydrocarbons at a further location e.g. at a further at least one of, or at a location within, the output set of locations.

A further aspect of the invention relates to a method of prospecting for hydrocarbons, the method comprising determining a possible location of hydrocarbons as described above, and using the determined possible location of hydrocarbons in the decision-making process for the drilling of a well.

The method may further comprise drilling for hydrocarbons at the determined possible location of hydrocarbons.

As will be appreciated, the present invention may be useful in any situation where an understanding of the structure of a subterranean region (e.g. mapping out subterranean features) may be beneficial or desired.

For example, the method of the present invention (e.g. as described above with any of the optional or preferred features) could be used in a method to determine a volume or volumes of one or more subterranean features, e.g. geological features such as hydrocarbons.

The method of the present invention (e.g. as described above with any of the optional or preferred features) could be used in a method of determining the location of any (e.g. one or more) geohazards, such as methane pockets. This could be useful in the deciding where/how to drill or excavate, e.g. for hydrocarbons or creating a tunnel or other subterranean structure.

The method of the present invention (e.g. as described above with any of the optional or preferred features) could be used in a method for determining the location of any aquifers, and/or their structure (e.g. whether they are closed or open).

As described above, for example, aspects of the invention may represent objects of interest in the subsurface with tiles. A tile may be a representation of a local reflector, and many or all properties of the seismic data that can be defined relative to a small reflector surface, may be extracted in a neighbourhood of each tile. A larger reflector surface (e.g. a patch) may be represented by a number of connecting tiles, e.g. in the same manner as a road may be represented by a number of connected road segments. The lateral variation of properties over a patch, such as amplitude, dip or any other attribute, may be described by the attributes of the individual tiles that make up the patch. This construct allows objects such as patches to be represented by tiles that can be stored in a table, e.g. for easy application of logic.

As described above, it is preferred that the tiles have the same size (e.g. the tile "footprint" consists of/contains the same number of traces). One benefit of tiles having the same size is that the properties extracted from the ensemble of traces in each tile, will then show the same statistics and as such be directly comparable.

For similar reasons, it may also be beneficial that tiles have the same shape and/or are defined on a regular lateral grid. In this manner, the tile grid parameters size, shape and lateral grid, are independent of the data from which the tiles are extracted.

Tiles may be used to model not only geological events but also artefacts such as noise from seismic acquisition. Aspects of the invention may thus be able to identify features in datasets where no a priori information exists about the subsurface to which the dataset relates. This may be facilitated by defining standard tiles on a regular grid, as the algorithms that may be performed on the set of tiles can be invariant of location, making it possible to apply functions/algorithms that work on a local neighbourhood of tiles.

At a later stage, e.g. once structures of particular interest have been identified, e.g. as described above, new grids may be created and adapted to the structure. A geological model may be created and/or populated, e.g. to represent a hydrocarbon reservoir.

Any of the above methods are preferably at least partially performed on a computer or computer system.

The method may further comprise performing a seismic survey to obtain the data cube of seismic data.

A further aspect relates to a computer program product comprising computer readable instructions that, when run on a computer, is configured to cause a processer to perform any of the methods described above.

A further aspect relates to a computer program product for analysing seismic data from a geological structure, the computer program product comprising computer readable instructions that, when run on one or more computers, are configured to cause one or more processors to:
  determine a set of tiles from a data cube of seismic data; and
  determine which tiles of the set of tiles can be grouped into one or more patches of tiles.

A further aspect relates to a system for analysing seismic data from a geological structure, the system comprising one or more software elements arranged to perform any of the methods described above.

In a preferred embodiment, the system comprises:
  a tile generator for determining the set of tiles from a data cube of seismic data; and/or
  an object generator for determining which tiles of the set of tiles can be grouped into one or more patches of tiles.

The system may further comprise:
  a control unit;
  one or more libraries; and/or
  one or more user interfaces such as a plug-in or web interface.

The libraries could contain rules, logic or recipes for identifying tiles, patches or other objects such as described above.

A system may comprise one or more memories and one or more processors configured to perform the method(s) as described above. The one or more memories may store data used as an input to the method (e.g. seismic data) and/or data output from the method. The one or more processors may be programmed with software (e.g. computer program(s)) which causes them to perform the method of the present invention. The system may comprise one or more screens and/or data input means, e.g. for a user to control the performing of the method and/or see the output of the method on a screen.

The invention involves analysing seismic data to identify patches of tiles, with the patches corresponding to possible reflectors in a geological structure, for example. By analysing the seismic data in this way, this can allow for a more accurate and, moreover, an automated identification process of possible geological features or other features of the geological structure. As the process can be automated, it can be performed, for example, by a computer, with associated improvements in speed, accuracy and cost.

Thus, for greater speed and efficiency, the method is preferably performed on, or implemented by, a computer.

The methods in accordance with the present invention may be implemented at least partially using software e.g.

computer programs. It will thus be seen that when viewed from further aspects, the present invention provides computer software specifically adapted to carry out the methods herein described when installed on data processing means (e.g. one or more processors), a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The invention also extends to a computer software carrier comprising such software which when used to operate a processor or microprocessor system comprising data processing means causes in conjunction with said data processing means said processor or system to carry out the steps of the methods of the present invention. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that in some embodiments, not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with (or within) a computer system. Such an implementation may comprise a series of computer readable instructions fixed on a tangible medium, such as a non transitory computer readable medium, for example, diskette, CD ROM, ROM, RAM, flash memory or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

BRIEF DESCRIPTION OF THE DRAWINGS

Preferred embodiments of the invention will now be described by way of example only and with reference to the accompanying drawings, in which.

DETAILED DESCRIPTION

The present invention relates to a method of analysing seismic data. The method involves identifying tiles in the seismic data, grouping those tiles into patches, if possible, and then analysing the patches to identify geological structures or other features of interest such as flat spots.

The method is implemented (at least partially) by software, which is configured so as to cause one or more processors to perform the method.

Figure 1:
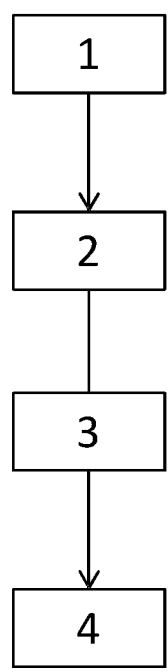
FIG. 1 is a flow chart outlining the main steps in a method according to an embodiment.

FIG. 1 is a flow chart outlining the main steps in the method. The input to the method is seismic data cube, which is obtained at step 1. The output of the method comprises identified tiles and patches, as well as objects representing possible geological structures or other features identified from the patches.

At step 1, a seismic data cube is obtained.

At step 2, the seismic data cube is analysed to identify tiles within the seismic data cube. A tile is a small piece of a reflector in the subsurface from which the seismic data derives.

At step 3, the tiles are then analysed to identify patches of tiles. A patch is a group of tiles which line up with each other within a predefined tolerance.

At step 4, the patches of tiles (or at least some of them) are analysed to identify objects such as geological structures or other features of interest such as flat spots.

Each of these steps will now be described in more detail.

At step 1, a seismic data cube is obtained. The seismic data cube can be an existing (already collected) seismic data set or it can be a newly-collected seismic data set. For example, the method can be applied to seismic data sets that have already been analysed (e.g. using a prior art method) to check for any possible geological structures or features that had not previously been found. The step of obtaining seismic data 1 can mean measuring and recording seismic data (e.g. as described below) or it can mean obtaining it from a memory. In one embodiment, the software is configured to obtain seismic data by measuring and recording seismic data. In an alternative embodiment, the software is configured to obtain seismic data from a memory (or memories).

Figure 2:
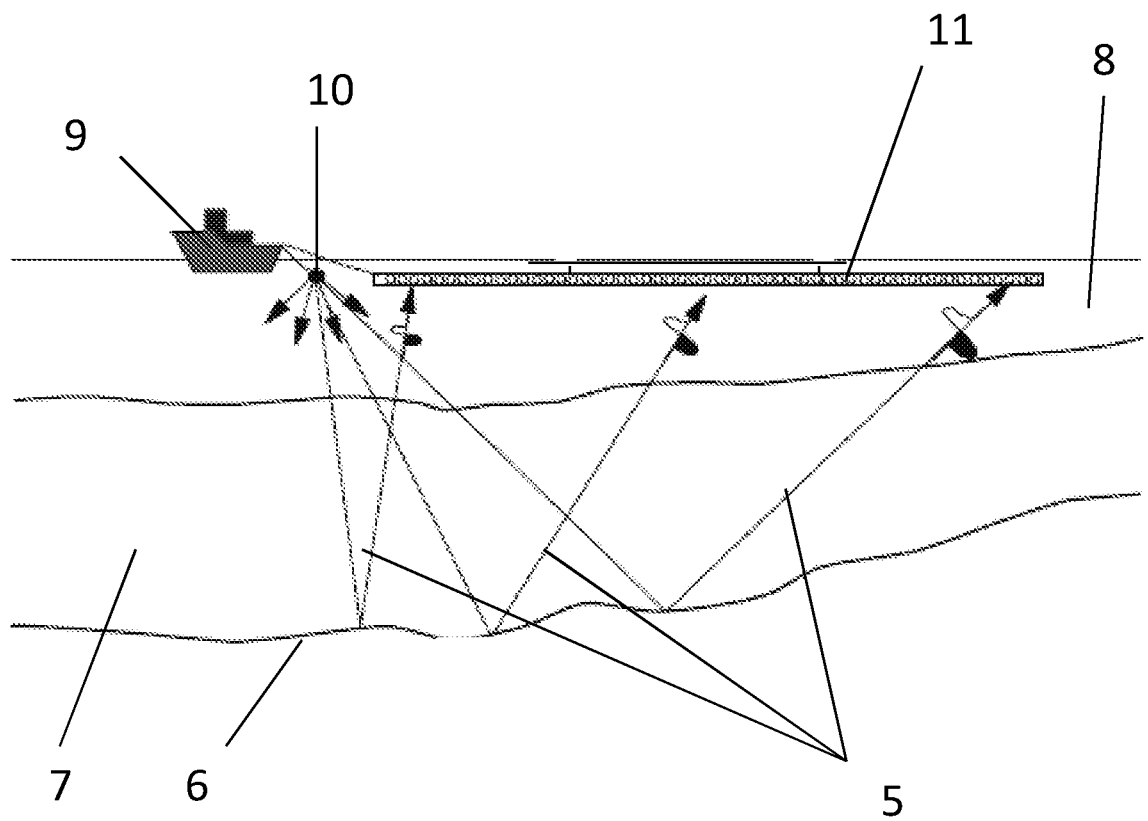
FIG. 2 is a schematic diagram of a standard system which can be used to collect seismic data.

FIG. 2 illustrates a standard system which can be used to collect seismic data. However, any system which can be used to collect AVO seismic data can be used.

As shown in FIG. 2, a boat 9 tows a seismic source 10 and a seismic receiver array 11, across an area of water 8 and over a subsurface 7. The seismic source 10 is located in front of the seismic receiver array 11 in a towing direction.

In an embodiment, the seismic source 10 is an air gun. However, other kinds of seismic sources could alternatively be used.

The seismic receiver array 11 contains a plurality of seismic receivers located at different horizontal distances (offsets) from the source 10. In an embodiment, the seismic receiver array 11 is around 6 km long.

In operation, the seismic source 10 emits seismic waves which travel out from the source 10 down through the water 8 and the subsurface 7 and reflect off of a boundary 6 (reflector) in the subsurface 8. The boundary 6 is a reflective surface at which two different types of subsurface matter meet (e.g. hydrocarbon-saturated rock such as a sandstone reservoir, brine-saturated rock, rock impermeable to hydrocarbons such as shale, or rocks of different properties). For example, above the boundary 6 could be shale and below it could be an oilfield reservoir or hydrocarbon accumulation in a sandstone reservoir.

The reflected seismic waves, indicated by the arrows 5 in FIG. 2, are then detected by seismic receivers in the seismic receiver array 11 and recorded as seismic data. Such data is referred to as "pre stack" seismic data and is a measurement of reflection amplitude from the subsurface A(x, y, t, θ), where x and y represent the lateral position of the reflection point, t represents time, and θ is the angle of reflection at the reflector. The time t can be related to depth d by the equation:

$$t=2d/v \qquad (1)$$

where v is the average velocity of the seismic waves in the subsurface from the seismic receiver to the reflector.

As described above, once the seismic data has been obtained (step 1), the method involves identifying tiles from the seismic data cube (step 2).

A tile is a small piece of a reflector in the subsurface from which the seismic data derives. The tile could correspond to a part of a seismic horizon or it could correspond to a part of a non-geological feature such as a flatspot or an artefact such as a multiple.

The size of a horizontal or sub-horizontal (i.e. slightly inclined, but typically by no more that one sample step in a vertical direction for each sample step in a horizontal direction) tile will typically be selected to be around 21×21 ILs times XLs, which with a IL and XL sampling of 12.5 m would be 263×263 m. ("XL" stands for "crossline" and "IL" stands for "inline". This is relative to the seismic survey grid, where IL is in the direction of the sailing of the vessel performing the survey and, in the case of a "normal" survey, XL is perpendicular to IL.) Tiles will typically be square or rectangular.

In a seismic volume (data cube), tiles can be identified automatically by looking for planar features in the seismic data. Tiles will typically be set up to be on a regular lateral grid, with overlap.

The tiles can be any shape including square, rectangular, circular, elliptical or irregular in shape. In an embodiment, each tile has a central trace located at its centre. If the tiles are square or rectangular, then ideally they have an odd number of traces along each side, such that a central trace is located at the centre of the tile.

The shape and size of tiles can potentially adapt to the problem or particular situation in which they are being used. The tiles do not necessarily need to be planar (flat) but could be curved and/or have a discontinuity in them. However, for the purposes of this description, rectangular, planar tiles of a constant size are used in the examples discussed.

Software is written such that it defines small surface tiles of the seismic data cube, which typically each contain at least 40-100 traces, e.g. from 100 to 100,000 traces of seismic data. (A trace here is a curve describing seismic amplitude as a function of time, at one specific subsurface location. A seismic volume consists of a large number of traces, one for each subsurface location.)

In one embodiment, each tile contains 51×51=2601 traces.

An horizon tile detection technique which may be used in the present invention is that disclosed in GB 2429526. Horizon tracking with the tile (an horizon auto-tracking technique) involves selecting a seed point trace and checking its correlation with neighbouring traces. If it is possible to follow a high amplitude in an area the size of a tile, then that area may be defined as a tile. In an embodiment, a windowed three-dimensional linear Radon transform is used to identify the tiles, where the position and dip of the tiles are identified as local maxima and minima in the Radon domain.

One method of identifying or defining tiles can be described as follows. First, a sub-cube is defined (selected) from a seismic data cube with the lateral size of a tile. A tile candidate in that sub-cube is selected with a depth and a dip (inclination of the plane measured in ms/m in two orthogonal directions). Then, all of the traces in the sub-cube are summed into a single trace along the dip. This is repeated for all tile candidates in the sub-cube (i.e. all dips and depths). A tile candidate is confirmed as a tile (i.e. corresponding to a possible boundary) if the sum shows a local maximum with respect to depth and dips. If confirmed, the tile is stored in a table in memory (see below regarding what data about the tile is stored).

Figure 4:
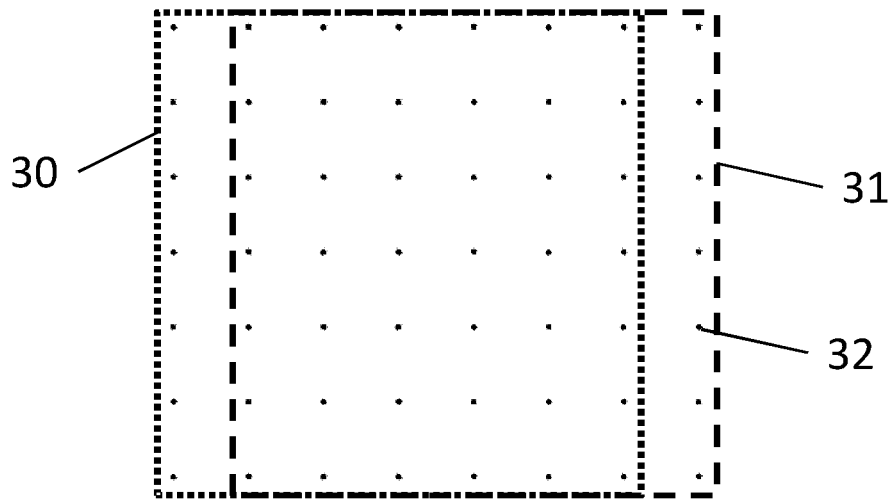
FIG. 4 is a schematic diagram illustrating the definition of two overlapping tiles.

The defined tiles have at least 50% overlap with adjacent tiles and, in some embodiments, close to 100% overlap. For example, in the case of square or rectangular tiles, adjacent tiles can overlap all traces except one (edge) row or column of traces. This is illustrated in FIG. 4, which shows two overlapping tiles 30 and 31, indicated by dotted and dashed lines, respectively. Each tile 30, 31 contains, as an example, an array of 7×7 traces 32 (each trace being indicated by a dot). It can be seen that tile 31 overlaps all but one column of the traces in tile 30, which corresponds to an 86% overlap.

In some cases, tiles are initially defined with around or close to 50% overlap and, if they are found to relate to an area of a possible fluid contact (following the steps described below), the tiles are re-defined with greater overlap (e.g. overlapping all except one column or row of traces of an adjacent tile) and the procedure repeated.

Thus, one way to identify horizontal or sub-horizontal planar tiles is to stack or sum the seismic data in a sub-cube with the lateral extent which is the same as that of the tile, in all dip directions. A tile is identified at the depth and with the dip (gradient) that gives a local maximum of the stack or sum. This method can be used as the basis of flat-spot detection, fluid effect (e.g. a boundary between two different fluids) detection, and fault detection. Faults could be detected by first creating a semblance or variance cube (e.g. a seismic cube that replaces the seismic amplitudes by a value that represents the continuity of seismic amplitudes at each sample, by analysing data in a small area around the sample) to highlight discontinuities, and then performing the same stack or sum in a sub-vertical or close to vertical direction. Alternatively, and probably preferably, faults could be detected from reflector terminations, which are described below.

The invention is particularly concerned with providing automated detection of all tiles in a seismic volume. The individual tiles are detected from a seismic sub-volume the same lateral extent as the tile. There is no lateral coupling to anything outside of the tile, which makes tile detection a fully parallelizable process (i.e. multiple tiles can be identified in parallel processes).

After running the tile detection on a dataset, all (or nearly all) planar features in the data which are at least as large as a tile, and fairly linear over the size of a tile, should be identified by one or more tiles. If the features are varying over a short distance compared to the extent of the tile, such as would be the case with a very rugose surface, the tile will not be able to adapt perfectly to the feature in the data, and would thus act as a lateral smoothing filter, where the smoothing effect is larger for larger tile sizes.

Tiles can be detected using any seismic data cube as input, such as different AVO (amplitude versus offset) cubes or semblance. Most elegantly, in some embodiments, the detection algorithm can create these cubes from the input data prior to running the tile detection algorithm, and store the tile parameters including the data inputs, so that it is recorded from which data cube each tile was identified and with which parameters, making it possible to return to the seismic data and calculate other attributes, if desired or needed.

It is important to note that tiles from the same lateral position can cross each other, i.e. have conflicting dips. Since the detection method involves looking for a local maximum in dip-depth space, and not a global maximum, it is possible to identify two tiles at the same lateral position and at the same depth that make up a crossing, as they can have very different dips. If this happens, there is not a single well-defined local dip at this location. A classical dip/azimuth calculation will assign one and only one dip to each sample in the cube, and cannot accommodate a situation like this. However, this is a very important situation to detect as unconformities, flatspots and multiples will create conflicting dips in the data and these features are important to detect.

Once the tiles have been defined they are stored in a memory, i.e. the data defining the tiles (position and dip, and possibly size) is stored in a memory. If the tile size is constant then it may not be necessary to store this for each tile. Rather, a single position can be stored, corresponding to a particular point (e.g. a corner or centre) of the tile.

Figure 3:
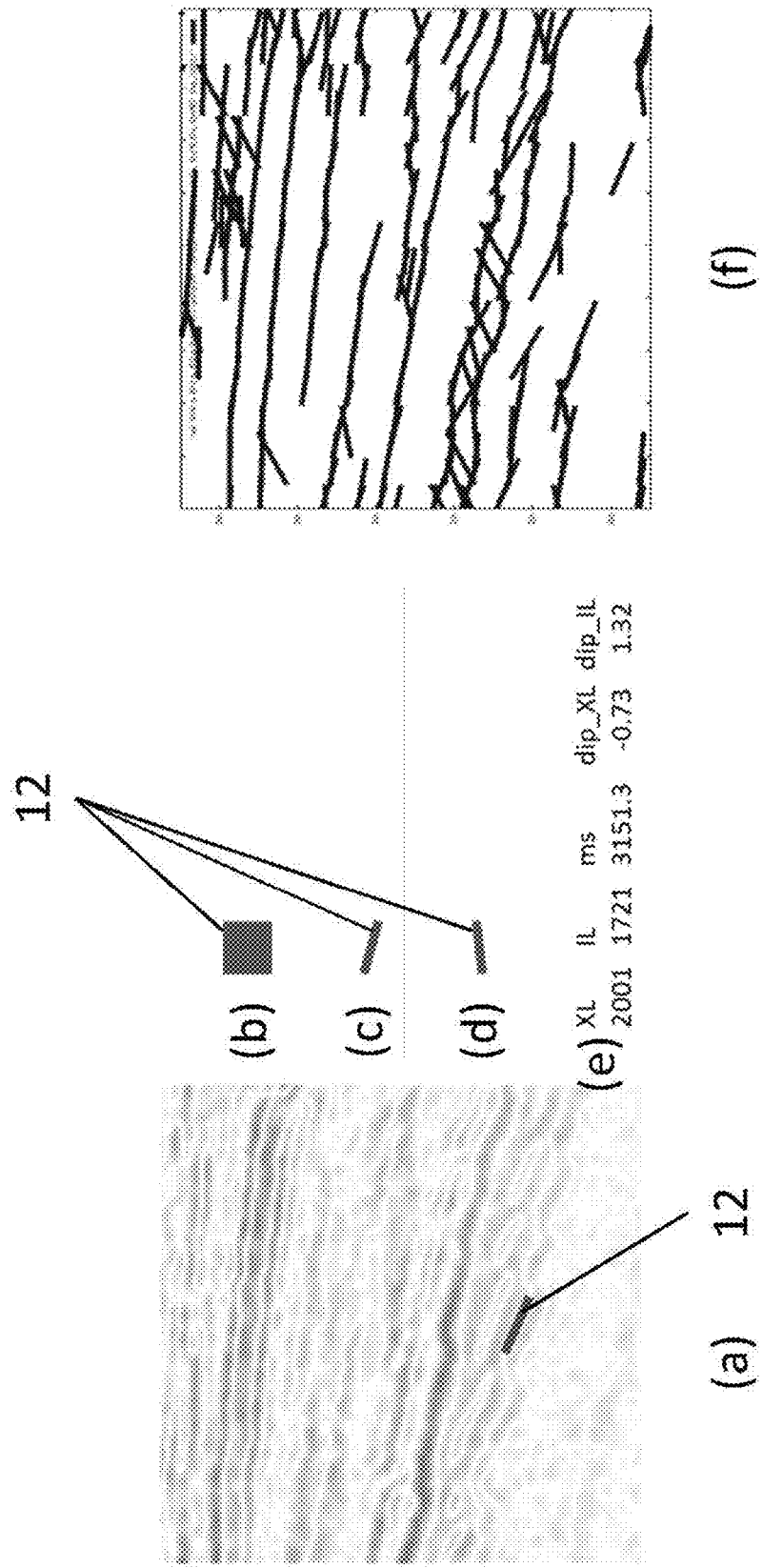
FIG. 3 illustrates how tiles can be defined in a seismic data set.

FIG. 3 illustrates how tiles can be defined in a seismic data set.

FIG. 3(*a*) shows a section of seismic data with one tile 12 indicated by the straight thick line.

FIG. 3(*b*) illustrates the tile 12 as viewed from above.

FIG. 3(*c*) illustrates the tile 12 as viewed on an XL section (one horizontal view).

FIG. 3(*d*) illustrates the tile 12 as viewed on an IL section (an orthogonal horizontal view).

FIG. 3(*e*) shows the parameters used to define the tiles in addition to size:

XL is the horizontal position in a first horizontal direction of the centre of the tile;

IL is the horizontal position in a second horizontal direction (which is orthogonal to the first horizontal direction) of the centre of the tile;

ms is the vertical position measured in time of the centre of the tile;

dip_XL is the gradient or slope of the tile in the first horizontal direction; and dip_IL is the gradient of slope of the tile in the second, orthogonal horizontal direction.

FIG. 3(*f*) is a chart showing depth versus one horizontal direction, illustrating many tiles which have been identified and each displayed on the chart as short thick lines at their corresponding depth and horizontal position. The x-axis of the chart shows the horizontal position in one direction and the y-axis shows the vertical position measured in units of time.

In the example shown in FIG. 3, the lateral size of the tile is 21×21 traces (IL×XL). Tiles are fully defined by their size, position in the seismic dataset and dip(s) (gradient or slope) (in two orthogonal horizontal directions).

Detecting all of the tiles in a seismic dataset can be viewed as a transform from the seismic domain over to the tiles domain. The benefit of the tile domain is that interpretation, particular by computers, is much easier in this domain than directly in the seismic domain.

Some embodiments involve the step of displaying all of the detected tiles as simple thin lines on a display such as in FIG. 3(*f*). This can be useful as it can act as a lateral low-pass filter with an aperture the size of the tiles, and as a way of enhancing planar features in the data that might be hidden due to interference from other events. Displaying the tiles as thin lines helps to more clearly display events with conflicting dips. This can avoid destructive interference from the negative and positive parts of the seismic signal found in standard seismic data, which has not been passed through a tile-identification algorithm.

Due to the relatively small size of each tile, the variation in amplitude or other properties across a tile is typically limited, and amplitude or other properties are thus well characterized by a single value, such as the average amplitude or other property. Thus, even if a horizon seen at large (in its entirety) has a varying amplitude at different lateral positions, each individual tile is characterized quite well by a single, average amplitude value. Variation in a property such as amplitude can be captured by statistical values such as variance, divergence and so on. This allows tiles to be characterised in a way that makes it possible to apply filtering and potentially machine learning with a large range of attributes to tiles, which is a much easier task than doing filtering and machine learning directly on seismic data sub-cubes.

Attributes can be assigned to tiles based not only on the seismic data volume that was used to detect or identify the tiles, but also from other seismic data volumes. Tiles can be detected from, for example, a full stack of seismic data, and then amplitude can be extracted from the near and/or far stack, for example. Checking that the tile dip, for example, is the same in the near and far stack is easy to do and is a convenient way to identify multiples.

Attributes can be extracted on different AVO data volumes, such as the fluid and/or lithology cubes of seismic data, and thus allow subsequent filtering or logics that exploit the AVO behaviour. Variation in AVO amplitude across the tiles is a topic of specific interest. For example, it is possible to measure from the tiles depth conformant amplitude shut-off in a fluid cube and little or no depth conformance in the lithology cube, facilitating the identification of whether a tile is likely to be a top reservoir tile crossing a fluid contact, thereby allowing the automation of the AVO reconnaissance workflow Amplitude variation as referred to above, typically refers to extraction of the average or maximum amplitude in a time window defined relative to the tile, typically below the tile and typically on a trace integrated cube to represent properties of the layer just below the tile, such as to represent properties in the top of a reservoir if the tile represents the top reservoir horizon.

Some attributes that can easily be determined or identified from tiles include:
- Dip and azimuth (these are properties of the tiles themselves—so there is no need for (further) calculation of these attributes). Azimuth is the direction of the maximum dip where the tile is represented or defined in polar coordinates, i.e. using (maximum dip, azimuth of dip), instead of (dip_XL, dip_IL).
- Reflector termination, by measuring that the reflector is present only in part of the tile, such as could happen in an erosion setting.
- Consistent amplitude decrease over the tile, e.g. associated with pinching out of layers.
- Faults or lineaments crossing the tile by looking for linear discontinuities across the tile.
- Data quality indicators, e.g. by extracting intercept and gradient from the data in the tile surroundings and measure how much of the data in the tile can be explained by the standard AVO model, or checking if the tile position and dip is consistent with other seismic data stacks than that from which it was extracted.

Attributes can also be assigned to tiles in a later step, e.g. by looking at the neighbouring tiles.

Such attributes can be stored with the tiles in the memory(ies).

Once a set of tiles has been generated (as described above), at step 3 logic is applied to connect the tiles together to form patches, where possible.

A tile can be identified (e.g. flagged) as being part of a continuous reflector (i.e. a patch) if it has neighbouring tiles on each side with similar dip and amplitude characteristics.

Figure 6:
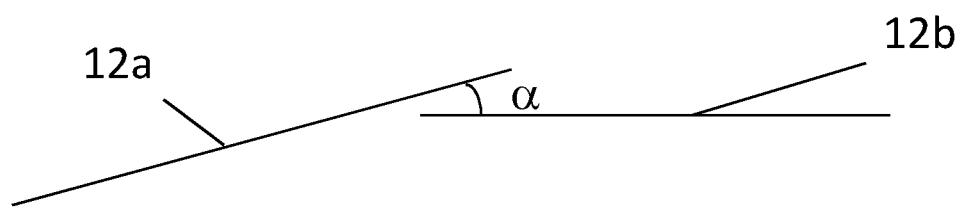
FIG. 6 is a schematic diagram illustrating a test for determining whether a pair of tiles belongs to a common patch.

FIG. 6 is a schematic diagram illustrating a test for determining whether a pair of tiles 12*a* and 12*b* belong to a common patch.

Logic can be applied to test whether pairs of tiles belong to a common patch.

Figure 11:
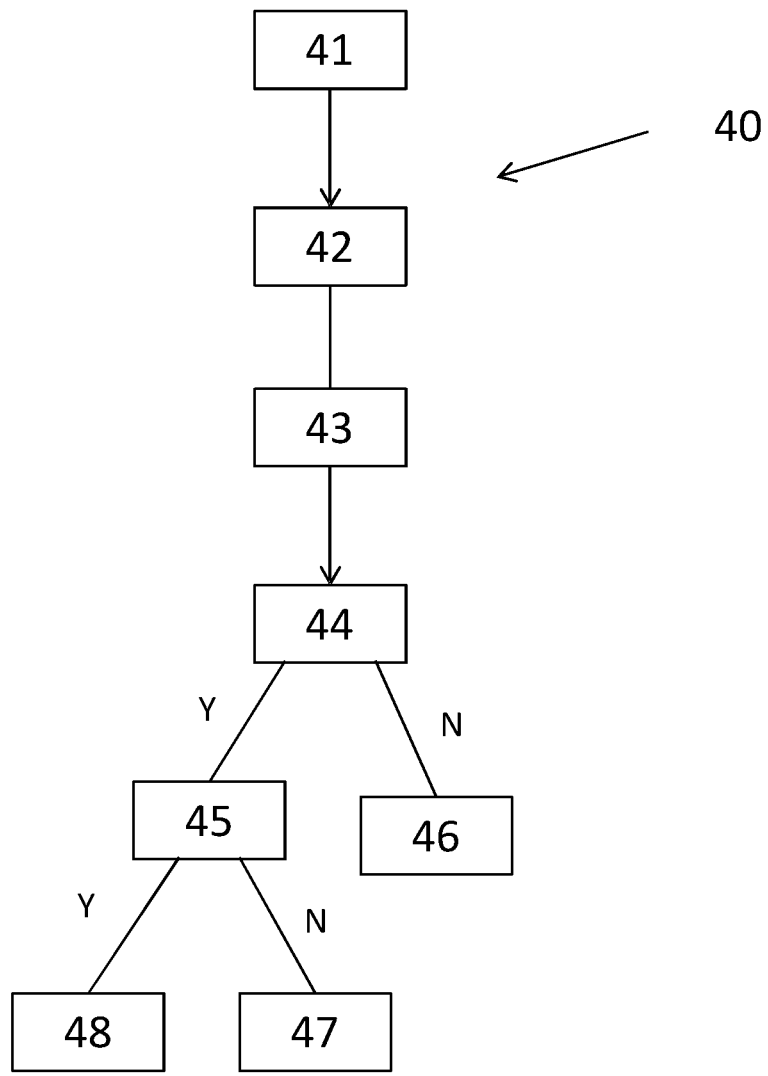
FIG. 11 is a flow chart illustrating a method for determining whether a pair of neighbouring tiles belong to a common patch.

FIG. 11 is a flow chart illustrating a method 40 that can be applied to test whether pairs of tiles (referred to as A and B below and in FIG. 12) can be assigned to, or be identified as being part of, a common patch. Aspects of the method 40 are further illustrated in FIG. 12, as described below.

This method to define patches is run over all possible pairs of neighbouring tiles that have been detected from the seismic data cube.

At step 41, the method finds the midpoint C between the tiles A and B. This is the midpoint on a line between the centres of the two tiles.

At step 42, tiles A and B are each projected onto the XL and IL axes. The method now has two tiles that overlap completely in XL, IL positions.

Figure 12:
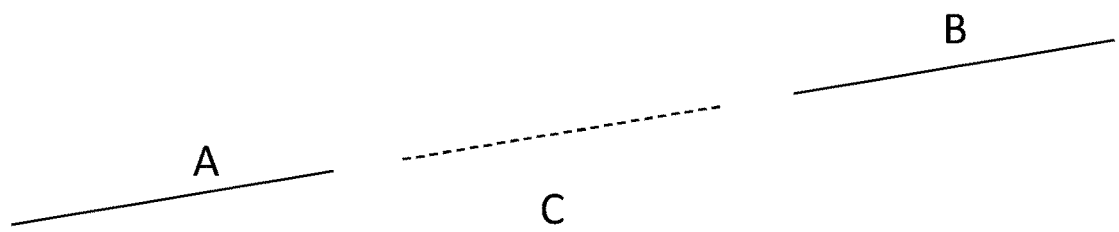
FIGS. 12(a) and (b) are schematic diagrams illustrating aspects of the method of FIG. 11.
Figure 12:
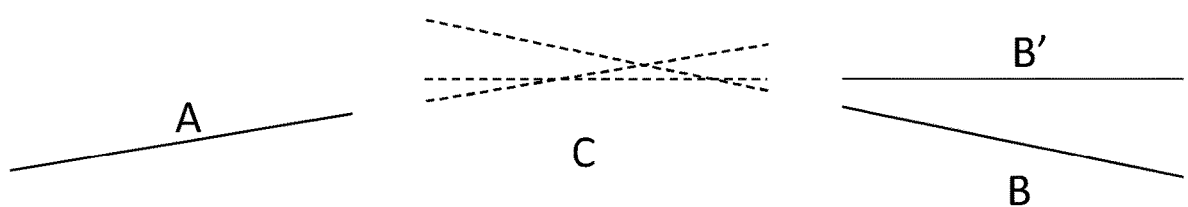

If tile A points "perfectly" (i.e. collinearly) to B, and B points "perfectly" (i.e. collinearly) to A, then two projections will be the same. Such a case is shown in FIG. 12(*a*). This is a perfect match in terms of geometry.

At step 43, the method calculates the difference between the projections. In one embodiment, the difference is calculated by determining the maximum time difference between the two projections. This is bound to be on the edge in cases where rectangular tiles are used. However, in other embodiments, other measurements of the difference could be equally valid.

This particular measurement is commutative, which is important as it is well-defined and independent from starting point.

At step 44, the method assesses whether the difference, determined at step 43, is within a predefined tolerance (e.g. less than a maximum tolerance value). The tolerance value applied will depend on the difference measurement used, the size of the tiles, and the size of any overlap or gap between the tiles. In some cases, a tolerance value of between 1 and 5 ms is applied. If a gap between the tiles is relatively large, then a relatively larger tolerance value is applied. If an overlap between the tiles is relatively large, then a relatively smaller tolerance value is applied.

If the difference is not within a predefined tolerance, then the two tiles A and B are identified as not being part of a common patch (step 46).

If the difference is within a predefined tolerance, then the method moves to step 45.

At step 45, the method checks whether there is one and only one match (i.e. tile identified as being part of a common patch with the tile A and/or B) within the tolerance.

If there is only one match, then the pairs of tiles A and B are identified as being part of a common patch (step 48).

On the other hand, if there are two or more matches (i.e. two or more tiles are identified as being part of a common patch with the tile A and/or B), then the two tiles A and B are identified as not being part of a common patch (step 47). Such a case is illustrated in FIG. 12(*b*), which shows two tiles B and B' as being identified, within a predefined tolerance, as being part of a common patch with tile A.

This check at step 45 helps to ensure that the patches are well-defined.

The patches are stored in memory by identifying the tiles from which they are composed.

The tiles which represent the terminations or edges of the patch are identified and indicated (flagged) as such in the memory.

A threshold can be applied such that patches with fewer than a predefined number of tiles can be discarded or ignored in subsequent analysis. For example, only patches with more than 9, 20 or 100 tiles can be retained, stored in memory, displayed on a display and/or included in subsequent analysis.

Once such patches of tiles have been identified, these are then analysed using logic, which can be created (if needed) and then applied, machine learning, and/or a human interpreter to identify objects such as horizons or faults or other e.g. non-geological surfaces in the seismic data such as flatspots or multiples.

Figure 10:
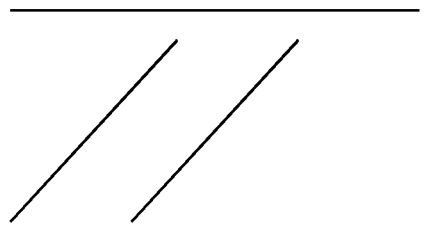
FIG. 10 illustrates various geological and other features which can be identified from patches.
Figure 10:
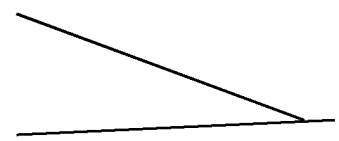
Figure 10:
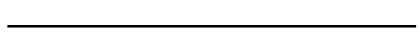
Figure 10:
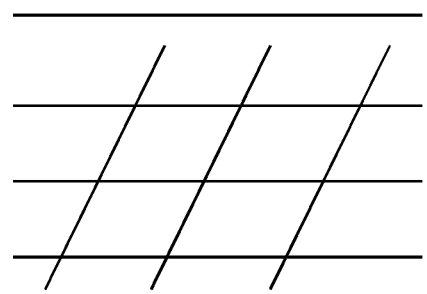
Figure 10:
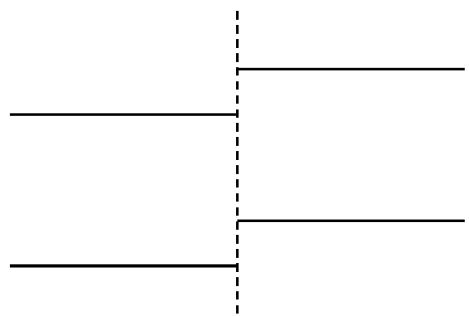

FIG. 10(*a*)-(*e*) shows five examples of different features which may be detected from patches. In FIG. 10, each of the solid lines represents a patch.

FIG. 10(*a*) illustrates an unconformity. If such an arrangement of patches is found then an "unconformity" object can be defined, identified by the patches, or the tiles from which the patches are formed, from which the unconformity is formed. Logic can be run over all possible combinations of patches looking for instances where such an arrangement of patches is found. Such logic could, for example, look for two or more substantially parallel patches which terminate near a further patch which is not parallel to the parallel patches.

FIG. 10(*b*) illustrates a pinchout. If such an arrangement of patches is found then a "pinchout" object can be defined, identified by the patches, or the tiles from which the patches are formed, from which the pinchout is formed. Logic can be run over all possible combinations (pairs) of patches looking for instances where such an arrangement of patches is found. Such logic could, for example, look for two patches which terminate at or close to the same point (or, in three-dimensions, along the same line).

FIG. 10(c) illustrates a flatspot, which is represented by a single, horizontal patch. If such a patch is found then a "flatspot" object can be defined, identified by the patch, or the tiles from which the patch is formed, from which the flatspot is formed. Logic can be run over all patches looking for instances where such a patch is found. Such logic could, for example, look for any patch which is horizontal (or very close to horizontal).

FIG. 10(d) illustrates multiples. If such an arrangement of patches is found then a "multiple" object can be defined, identified by the patches, or the tiles from which the patches are formed, from which the multiple is formed. Logic can be run over all possible combinations of patches looking for instances where such an arrangement of patches is found. Such logic could, for example, look for a series of two or more parallel patches which cross over one or more further patches.

FIG. 10(e) illustrates a fault. For clarity, the fault is indicated by the dashed line in this figure, which is not a patch. If such an arrangement of patches is found then a "fault" object can be defined, identified by the patches, or the tiles from which the patches are formed, from which the fault is formed. Logic can be run over all possible combinations of patches looking for instances where such an arrangement of patches is found. Such logic could, for example, look for two or more substantially parallel patches which terminate along a common line (or surface, in two dimensions), with at least one patch being located in each side of the common termination line (or surface). The common line (or surface) along which the patches terminate corresponds to the fault.

In one embodiment, a fault can be identified or defined by a set of fault tiles that can be assigned a throw value, i.e. a value representing the vertical displacement of the corresponding patches on each side of the fault tile, based on the reflectors on each side of the fault tile. A single fault tile would have one value for throw, whereas a fault will consist of a large number of connected fault tiles and can thus have continuous variation in throw along the fault.

In a similar way a tile could be flagged as being close to an unconformity, e.g. in an area of growth, in an area of chaotic reflectivity and so on, dependent on the tiles in its neighbourhood.

Most of these investigations can be performed by looking (considering data) only in a region around each tile in a patch.

In some embodiments, the logical tests described above (with reference to FIG. 10) are combined with an analysis of one or more geophysical attributes such as amplitude. Such geophysical attributes can be obtained directly from the seismic data and are not attributes of the tiles. However, the seismic data cube(s) from which the geophysical attribute(s) are obtained need not necessarily be the same as the seismic data cube from which the tiles are defined.

In one embodiment, the tiles are defined from an AVO seismic data cube. However, amplitude values from one or more other seismic data cubes (e.g. a fluid or lithology seismic data cube) are then also analysed to improve the analysis and identification of objects such as horizons or faults or other e.g. non-geological surfaces in the seismic data such as flatspots or multiples.

Figure 5:
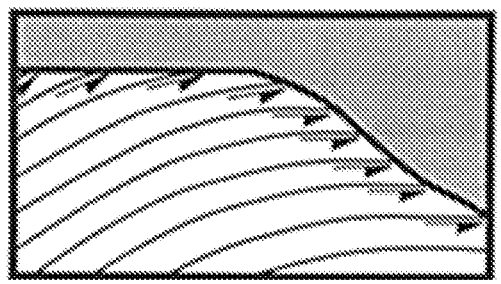
FIG. 5 is a cross-sectional diagram of a geological structure illustrating erosional truncation.

FIG. 5 is a cross-sectional diagram of a geological structure illustrating erosional truncation. The lines illustrate the boundaries between different material types or rocks within the geological structure. Erosional truncation implies the deposition of strata and their subsequent tilting and removal along an unconformity surface. This termination is the most reliable top-discordant criteria of a sequence boundary. Such truncation can also be caused by termination against an erosional surface such as a channel.

Since erosional truncation can be described in terms of a simple figure with lines, such as FIG. 5, logic criteria may be defined and applied to tiles to identify such a geological feature. For example, the logic could first find if a tile represents a termination, and then whether this termination corresponds to erosional truncation (or any other truncation) by checking the tiles in its immediate neighbourhood. An "erosional truncation point" object can be defined in this way from the tiles.

Further, it can be checked (e.g. with logic/software) whether several of these erosional truncation points line up to form a continuous surface. A new "unconformity" object can be defined from such a line of erosional truncation points if this is the case.

Attributes are useful for later use such as filtering or connecting tiles together to form objects such as reflector patches, horizons, faults, unconformities, multiples.

It is possible to flag seismic noise in the form of multiples (i.e. multiple reflections) by investigating relationships between tiles with a larger separation distance (e.g. non-adjacent tiles). For example, a check can be performed for the most likely multiples by checking the ray paths. The first seabed multiple will, for example, be found in the dataset at a time which is 2T, where T is the time (corresponding to depth) of the seabed. This geometrical check can be performed by a computer and it can also check other ray paths. Multiples are typically created by strong events and if a multiple is strong enough to be detected as a tile, is it very likely that the multiple generators are detected as tiles as well. For each tile, the computer can thus compute an attribute for the tile that gives the probability that the tile is a multiple, with a link to tiles that are likely multiple generators. In a graphical user interface (GUI), one could then e.g. visualize multiples in the same colour as the likely multiple generating surfaces, or weight down or disregard any features that are detected where multiples play a part (a multiple crossing geology could for example appear like a down-lap).

Larger objects such as horizons, faults, flatspots, and combinations of these again such as prospects, can be defined as a set of tiles. Since all the linear (or actually planar) elements in the seismic data will be represented by tiles, all horizons and faults can be described from a set of tiles. This can be done, for example, using human and/or computer analysis of the tiles.

A horizon, for example, can be defined by a collection of pointers to the tiles from which it is made up, potentially including also pieces of manual (human) interpretation for example to fill in the missing gaps, e.g. in areas completely dominated by noise (where a model-driven manual interpretation might be the best and only option).

If a complete horizon surface is already identified by a different process such as auto-tracking or manual tracking, the actual horizon should be stored also in a horizon repository.

A fault can be defined in the same way.

Onlaps, toplaps and all sorts of geometrically defined locations in space can be detected and defined the same way, i.e. as a set of tiles that relate in a specific way. These can be stored in memory as objects of their own that point to the tiles that define them. A prospect can be defined by a pointer to horizons and faults and potential flatspots.

Horizons, faults and other objects have names and other properties that a user can assign to them, such as the person that interpreted it, its name and age. The size or area of the horizon, e.g. the number of tiles it consists of is an attribute that is computed automatically during interpretation, and that is useful for filtering and/or display purposes.

A pointer to each tile can have its own properties (e.g. that are not properties of the tile or the horizon but of the pointer) such as the confidence level of the tile is actually belonging to the horizon.

Faults can have an attribute defining which side of the tile is the hanging wall, if the fault is normal or reverse, and so on. As mentioned before, throw magnitude is a variable on fault tile level, as it will vary over the fault.

This flexible data structure thus allows assigning attributes to the tiles themselves, attributes to the objects defined from tiles (horizons, faults, truncations, etc) and attributes on the connection between objects and tiles, as well as more complex objects that point e.g. to multiple horizons. The assignment of such attributes can be done by computers and/or humans, and it should be possible to store text-based comments on all objects such as to capture also knowledge elements not explicitly allowed for in the current data structure.

Since objects are defined by pointers to tiles, any given tile can belong to many objects. It could belong to a patch of tiles that line up to form a larger surface, and at the same time to a growth package that only contains part of the patch, and at the same time to an fluid contact object (tiles connected in a space that likely contains a fluid effect) which again contains tiles that belong to different patches. A lot of complex relationships can be defined in this way.

Figure 7:
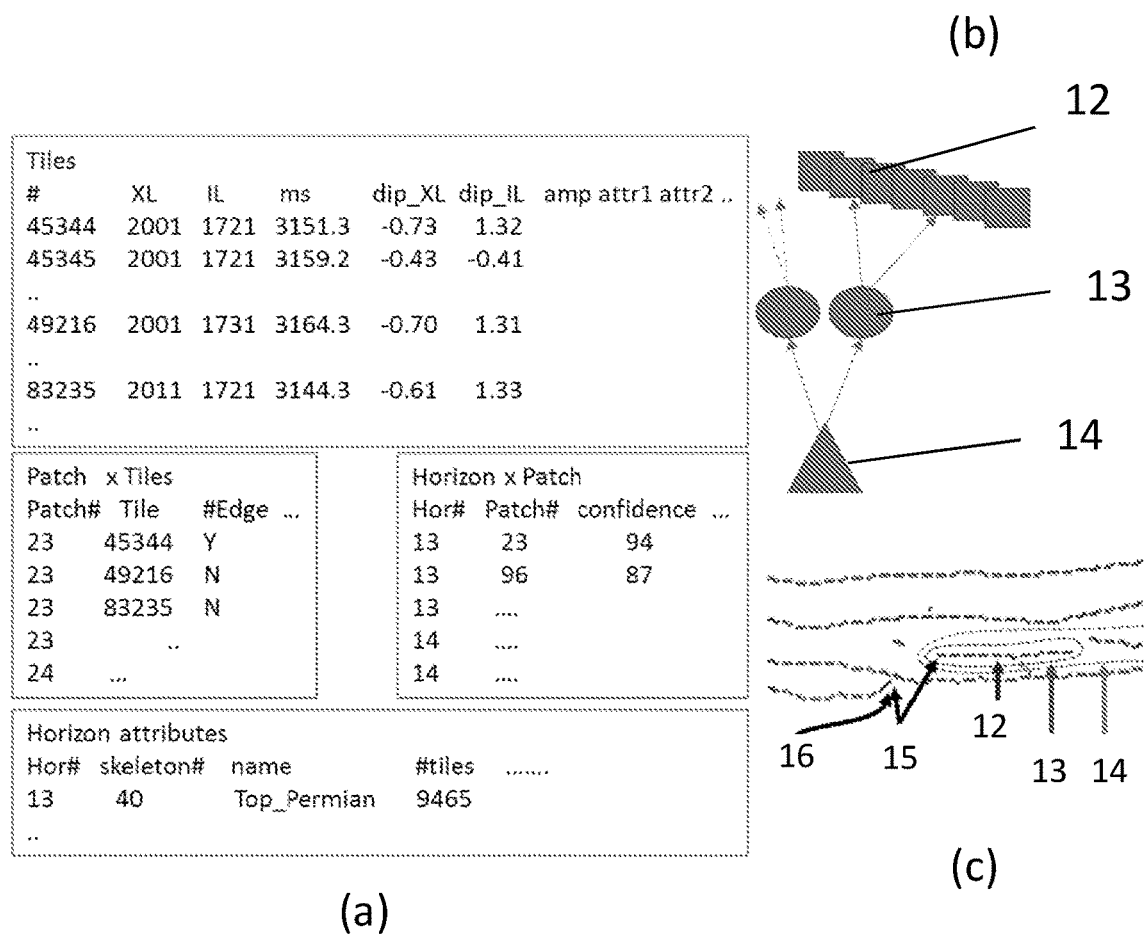
FIG. 7 shows an example of a data structure defining horizons from tiles via patches.

FIG. 7 shows an example of a data structure defining horizons 14 from tiles 12 via patches 13. The tables in FIG. 7(a) illustrate the data structure in a relational database and set out the various attributes defining the tiles, patches and horizons.

FIG. 7(b) shows the relationship between the tiles 12, patches 13 and horizon 14 in a schematic form.

FIG. 7(c) is a cut-out from a display of an actual tile detection process illustrating how a patch 13 is made up of a set of tiles 12, and a horizon 14 is made up of a set of patches 13. It also shows how a tile 12 that is part of a patch 13 can also be part of a different "Fluid effect" object, for example. A termination 15 can be identified as an edge of a tile where there is no neighbour on all sides. Dependent on the angular relationship to tiles in the local neighbourhood, the termination 15 might be further classified as an unconformity 16. A region of parallel layering as shown at the top of FIG. 7(c) is easily identified by looking at the dips of the layers above and below any given layer in that region.

Metadata from the cubes that were used to create the tiles should also be stored with the tiles, so that one has the recipe or instructions for re-creating the tiles.

All of this data should be stored in a central archive with use of standardised naming of horizons and so on. This will be a very valuable repository of tiles with labels and connections.

As tiles can be automatically detected by a computer, a computer can then perform logical operations ("recipes") on these tiles, implemented by software, to identify sensible (e.g. meaningful) connections between tiles to form horizon and fault segments, or other objects, for example, and again to identify sensible connections between faults and horizon segments to form a structural framework. A system or method for automatic prospect definition can thus be created. Combining this with automatic detection of direct hydrocarbon indicators (DHIs) such as flatspots and AVO amplitude changes can result in further useful information being derived from the data.

Software could identify any regions with poor data quality, e.g. from observing large variations in amplitude over the tiles, from a multitude of tiles with many conflicting dips, or from inconsistent AVO behaviour as measured on the tiles, and then flag such regions, or objects defined in such regions, as having a lower confidence associated with them.

Explicit software or logic to perform such tasks (identifying objects such as those defined above) could be used. Alternatively or additionally, the identification of such objects could be performed using machine learning.

One way of building recipes (or logical instructions) and at the same time creating instant value for a user can be to first detect tiles automatically, then let a human assist in making a complete horizon-fault framework on a single section, using general recipes as much as possible as opposed to manual connections. Then, the computer can suggest how this would look on a new line.

When a human and/or computer has connected tiles in a section, say on Inline (IL) #1000, by connecting tiles to form the key horizons and faults, it will then be straightforward for a computer to propagate this to IL #1001 or #1010, as the tiles are extending in both the IL and XL directions and the dip of each tile is known. In this way, the whole section interpretation can be done automatically on the next inline. This new way of auto-tracking allows for consistency checks of isochrones, fault throws, growth strata and so on while tracking, as it is the complete structural interpretation (the skeleton interpretation) that is tracked, not individual horizons and faults as in the prior art.

Autotracking of horizons uses a seed point or a set of seed points to track from. Consistent section autotracking uses a complete interpreted section (or multiple sections) as seed(s) for a full interpretation.

When the computer finds an inconsistency, a human can investigate and fix this and at the same time add new rules to be able to identify the inconsistency earlier, most likely through explicit coding of the rules and warnings, but also possibly through machine learning. This interactive mode of using the tiles only on a single section that is displayed, and a few sections on each side, does not require pre-calculation of tiles over the full cube as the tiles can be calculated on the fly only for the section being viewed. The computer will be able to make use of attribute extractions on different cubes that can be calculated on the fly from the data such as AVO cubes (that are only a linear combination of offset/angle stacks) and semblance or variance cubes. The individual cubes do not need to be stored, only the instructions or rules (recipes) for making them.

It would typically make sense to provide an interpretation on two sections perpendicular to each other in this mode when doing this kind of interpretation.

Again, capturing the manual steps in this tracking exercise adds to the repository of tiles and associated information of how they can be connected to form objects.

When a set of rules has been applied, it will create great value just to run existing interpretations through the computer to check for warning flags.

The labelled (identified) tiles describe a mapping from a seismic dataset to horizons, faults and hydrocarbon prospects. Since the tiles can be automatically detected from the data, it is possible to replace the input dataset with new data (of the same geological structure or region), use the existing tiles as a starting point, re-position them to the new data and re-extract the attributes. It is also possible to keep track of the position of each tile in both datasets and thus use the difference in tile position, dip and properties to describe the difference between the datasets, which could be of interest to describe uncertainties.

An example of a method which can be used to perform detailed structural interpretation is "skeleton mapping", which is performed by drawing lines where high-confident reflectors can be seen but not necessarily making the lines continuous. This method involves the manual digitizing of horizon segments (skeletons) on paper or by digital hand-drawing of them.

A good starting point for a skeleton interpretation could be achieved by running automatic tile detection on the section. The tile detection runs inherently in three dimensions and thus finds small two-dimensional tiles and not one-dimensional lines but if one wanted to replicate as close as possible the skeleton mapping approach, one dimension could be collapsed so that tile detection is performed only in two dimensions and thus identifies lines. The tiles that line up to form a continuous event are easily connected to create longer lines or patches when working in three dimensions. The same stepwise logic as is familiar in the art of skeleton mapping, is that of growth strata mapping, dip domain boundaries/axial mapping, skeleton labelling, key horizons mapping, faults mapping, quality control of interpretation and kinematic validation testing can be applied on the set of tiles, for example by applying human assisted computer logic. Repeated application and continuous improvement of this will gradually improve the logic, making it possible for the computer to perform more and more of the process. Described in a more abstract form, this is a way of digitalising structural geology knowledge.

Regions of parallel layers can be identified by a computer by the presence of tiles above and/or below another tile having similar dips.

Figure 8:
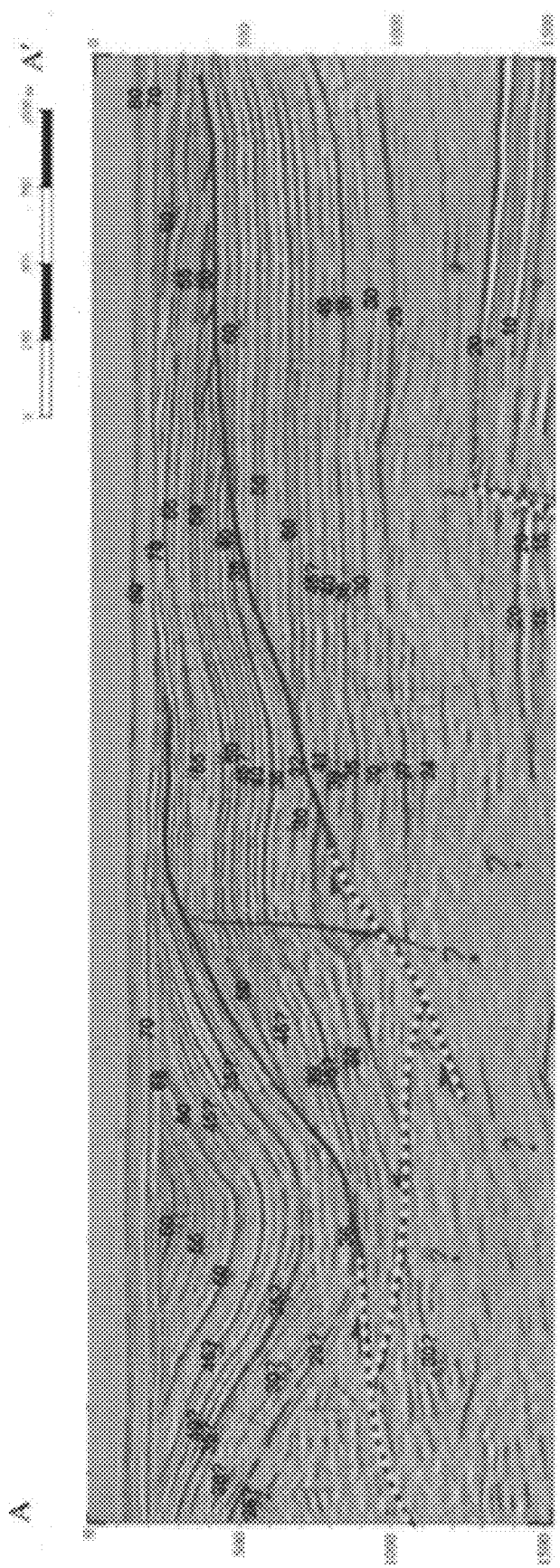
FIG. 8 shows the result from a prior art manual process of seismic data interpretation.

FIG. 8 shows the result from a prior art manual process. Faults have been identified and key horizons have been labelled across faults. Some areas are marked as unknown due to poor data quality. The labelling of the horizons in particular is a laborious process. It is not always evident to identify the same skeleton horizon across faults, and thus the labelling would potentially have to be re-done. However, a digital numbering as can be provided by the present invention would allow for easy renumbering.

To run an automatic process of horizon identification on the section shown in FIG. 8 using a prior art method would likely be difficult, both since this is compressional tectonics and thus the same horizon can be found at multiple depths at the same lateral location (which is not handled well by prior art autotracking techniques) and since the data quality is clearly so poor in areas that pushing e.g. horizon 20 in the picture above across the section, is not something that can be done with any reasonable confidence.

In contrast, the present invention would be able to capture the knowledge contained in the image in FIG. 8 by a joint user/machine effort, for example. Horizons defined by a collection of tiles can describe any geometry including multiple z values. If, for example a later stage, it is determined for example that horizon 20 is Top Permian (or any other name) this mapping is easily done once for all segments with this number, as they are already linked.

Using the method described above, it now is trivial for the computer to propagate this full interpretation to the next line. Consistency checks, both simple such as horizon isochrone variation, but also advanced such as kinematic validation can take place using not only one section, but multiple sections in a three-dimensional cube.

The present invention allows the signal-processing number-crunching part of geophysics to be handled as a separate step, i.e. in the identification and building of the tiles with attributes. This is an extension of what is usually done in this domain, where attributes are typically extracted on a trace-by-trace basis and values are returned on a seismic grid. Some standard attributes like dip and coherence are calculated from a lateral area, but again displayed on a regular grid. Computers can pre-compute a large number of attributes, e.g. all the known individual trace attributes, but also new ones that exist only in a tile setting, such as statistics over the tile.

After having performed the first step of pre-computing attributes, a table of tiles is provided, which is a format very well suited for data analytics. The work now is about joining and filtering the tiles to create larger objects that make sense. These are geometric objects with attributes that can be explained. Data scientists can access the table of tiles and perform a lot of interesting logics on the tiles, without necessarily needing to have an in-depth understanding of the heavy signal processing or having to work with seismic cubes at all. Seen this way, the tiles are simply a sensible temporary product that allows the separation of the heavy signal processing and hard-core geophysics attribute calculation jobs from the analytics job of connecting objects, looking for patterns, applying rules, displaying data and interacting with users in a sensible way. If it is needed to go back to the actual data to apply more complex processes in the analytics part, there is of course no problem in doing that as well, as each tile is stored with its "ancestry", i.e. in the form of which data sub-cube it was defined from. The tile is an attribute of the data by a certain recipe or logic and not an interpretation of the data, which makes a big difference.

A geophysicist, for example, may be responsible for ensuring that tiles are correctly identified and labelled according to AVO and determining whether they could be multiples and so on. A data scientist, for example, may be responsible for filtering, connecting and displaying the tiles in clever or useful ways. A geologist may be judging the result, for example dismissing solutions (object identifications) that make no sense. With the present invention, all of these processes can be performed in parallel: a geologist can explain why a certain geometry is not possible, a data scientist can improve the code to provide better solutions, and based on which tile attributes are helpful to make those better solutions, a geophysicist can improve on the attributes. By introducing tiles as a common point of focus, the geologist and geophysicist must explain their concepts and observations in terms of tiles, tile attributes and tile connections. The tile language is easier to relate to than expert terms in geology and geophysics, especially for data scientists, and thus good cross-disciplinary discussions and learning is facilitated, and the knowledge of how to make use of these concepts is thus "translated" to digital form by means of algorithms that can be applied on tiles.

A database of tiles and objects formed from groups of tiles, produced by the present invention, will provide easier access to seismically derived interpretation and knowledge. A database of tiles can work as an index or "deep links" to the seismic data, providing some further opportunities as explained below.

In an embodiment, the data generated by the present invention is presented (e.g. on a computer or other screen) in the form of an interactive map or chart, where it is possible zoom in or out of areas or use an interface to extract data from different areas. Seismic data in its raw form would likely be quite useless in such a scheme as there is no simple and effective way to display the massive amount of information contained in a seismic cube in such a setting. However, labelled tiles, and information extracted from those, would make much more sense to mine into and display. There are mega-scale attributes that could be calculated from the labelled tiles that could be presented or viewable (e.g. by selecting an appropriate option), such as amount of extension or compression in an area, dominant fault direction and so on.

Since seismic attributes have been extracted on a tile level and can be aggregated on a horizon level, questions or queries can be asked of the interactive map or chart (e.g. using a user interface) such to show or highlight particular features, such as "show me the horizons that contain a large number of tiles with a strong class 4 AVO response in the Jurassic" (e.g. if you were looking for source rock). If this particular attribute has not been calculated already for all the tiles on all the areas or fields of interest, it can be computed on demand, as the tiles are stored with information identifying from which seismic dataset they have been calculated and where that dataset is stored. The formula for the attribute calculation is supplied (e.g. by the user, via a user interface, if it is a new attribute) and, assuming an object-oriented approach, all the tiles can then return the value queried for. Thus, a single query could trigger the calculation of a specific attribute from millions of tiles across hundreds of data cubes. If a new attribute is defined by a user, e.g. that would be of interest for something, it can be applied to all data (e.g. world-wide) if so desired to gain new knowledge. In this way, the tiles provide a link between the high-level abstraction needed to do data science across the portfolio of data, and the actual raw data.

Usually, seismic interpretation is carried out on a local machine on which a suitable software program is installed. The choices of how the seismic data can be interpreted are dictated by the software program which is installed.

In the present invention, by moving the "book-keeping" of interpretation over to a central storage via tiles, and by doing a lot of the connection of tiles (e.g. to form other objects) in that location too, less work takes place on a local machine that an interpreter works on. The local machine becomes mostly an interface to display and filter tiles, adjust recipes (rules/logic) for how to connect them, name them and so on. The tiles database is connected to the seismic data and can use the computing power of a larger machine on which it is running to propagate the recipes of how to connect tiles to the bigger dataset. In this way, it is possible to move to more simple interpretation interfaces that display data and send commands back to a central unit. This would make it possible to do seismic interpretation in web browsers or similar, for example.

Figure 9:
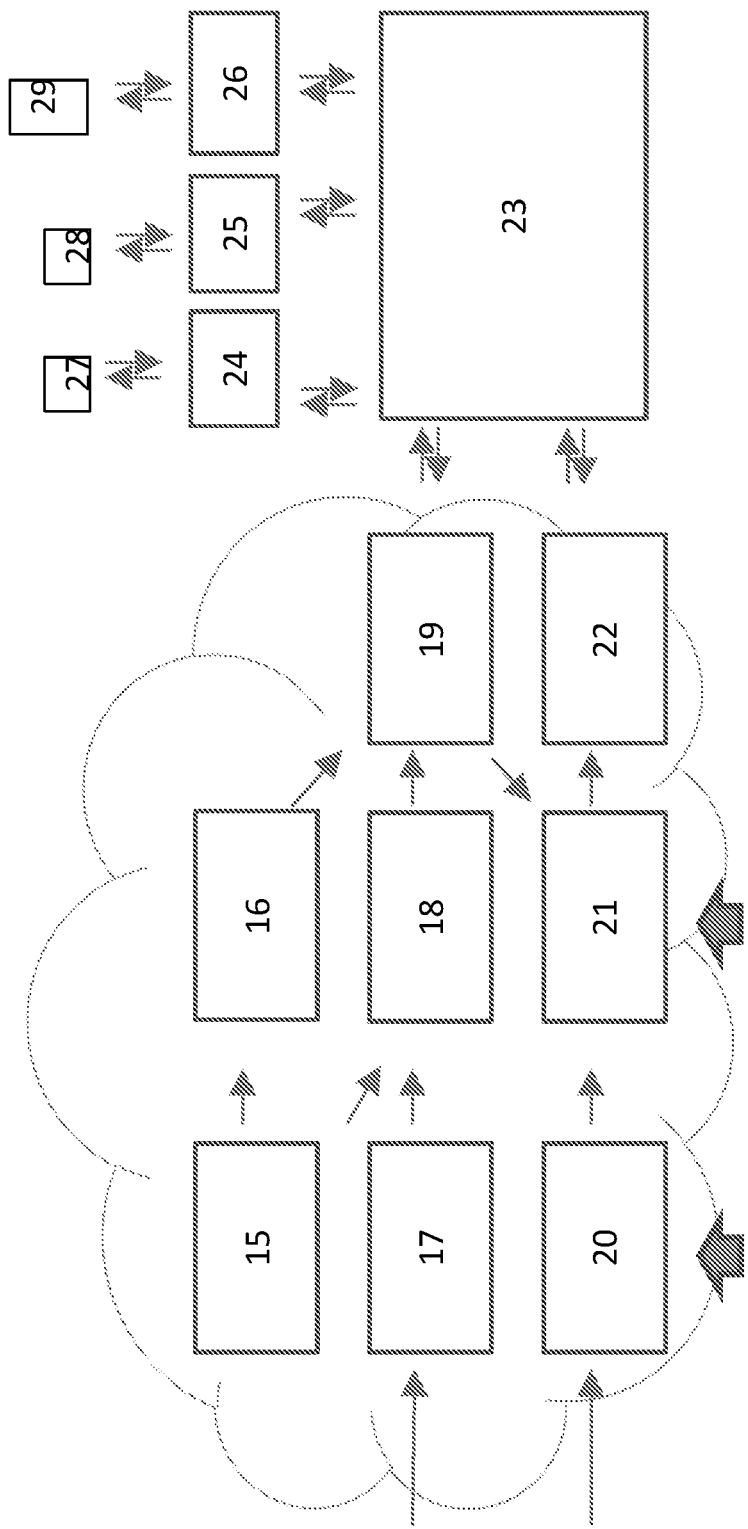
FIG. 9 is a schematic diagram illustrating an embodiment of a system for performing the present invention.

FIG. 9 is a schematic diagram illustrating an embodiment of a system of software elements for performing the present invention.

In the system, seismic data 15 is fed into a tile generator 16 which identifies and defines tiles from the seismic data as described above.

A library of seismic attributes 17 is also provided (e.g. from a seismic attribute library maintainer such as a geophysicist or data scientist) and, together with the seismic data 15, this is fed into an attribute extractor 18 which extracts attributes from the seismic data 15 based on the library of seismic attributes 17.

The set of tiles from the tile generator 16 and the attributes from the attribute extractor 18 are combined to provide a set of tiles with attributes 19.

A library of recipes (rules) to create objects from tiles 20 is also provided and an object generator 21 applies the recipes from the library 20 to the set of tiles with attributes 19. The output of the object generator 21 is a set of objects defined from the tiles 22. This could comprise patches, faults, prospects, etc.

Parts 15-22 of the system can all be comprised or performed in a cloud-based location, i.e. remote from a local user, and their corresponding steps can be performed, on demand, when instructed to by a control unit 23. The control unit 23 can be used to select, filter and control the tiles and objects defined from the tiles.

The control unit 23 can be controlled by one or more users 27, 28, 29, who communicate with the control unit 23 via a plug-in 24, 25 or web interface 26.

The arrows in FIG. 9 indicate the directions in which the various components can communicate.

Some further uses or implementations of the present invention are discussed below.

In the prior art, there is usually quite a bit of a cleaning job to be performed before an interpretation of seismic data can be modelled. Faults and horizons might not be consistent, and due to imaging issues at the faults, a typical auto-tracked horizon will bend very close to the fault, which known to be an artefact. When modelling this situation, a hole is cut in the horizon around the fault and then extended into the fault to avoid the bend artefact. Also, horizons and faults are modelled on a coarser grid than the seismic data, typically 50×50 m, whereas seismic data is often on a 12.5×12.5 m grid. In the present invention, when horizons and faults are defined in terms of tiles, such cleaning operations can be performed during the interpretation, creating a model-ready interpretation.

Attaching a depth conversion to the labelled tiles could enable the use of the horizons from the tiles directly into the modelling, and thus also the storage in the central repository of how the actual geological model relates to the tiles. This would enable the display of tiles from one domain to the other (displaying surfaces from reservoir models readily on seismic data and horizons from seismic data readily on reservoir models) to be able to quality control these and potentially learn how models are created such that new models can be created quickly if the input data changes and thus the tiles are updated.

Automatic horizon identification using tiles could be combined with wells in various ways, e.g. to come up with plausible horizon names for the horizons or by other means of using well information.

The present invention could be combined with process modelling. Software providing a process-oriented tool to model the Earth, which can describe a complex model with relatively few parameters, is already known. This is helpful in the sense that the modelled section necessarily makes geological sense, as it is created by processes like deposition, faulting and erosion. A relatively sparse input set such as horizon and fault tiles as identified by the present invention could be input into such a modelling technique, effectively performing a restoration of the section. The inclusion of process-oriented constraints is likely to improve on the automatic detection to ensure geologically consistent models.

Bigger and more complex tiles could be used in the present invention. In particular in areas with noisy data, or more specifically where the reflections associated with the structures of interest are weak compared to other reflections such as noise, it could make sense to work with larger tiles. One such case is to identify flatspots that set up weak reflections compared to the interfering geology. However, when tiles get large, it is less likely that the reflector will be captured well by the tile if the tile is planar. By introducing a sensible variation of the tile surface, such as describing it as a curved and not a planar surface, it is possible to adapt better to the reflectors. A flatspot could well be curved due e.g. to velocity effects in the overburden. In a similar fashion, other ways of introducing freedom to the tile could be found. Allowing one linear discontinuity across the tile and potentially different dips on the parts of the tile on either side of the discontinuity would allow the tile to be placed over a fault. By keeping the number of degrees of freedom limited, the tile would still not be able to adapt too much to the noise in the data, thus making use of the power of data stacking in detection but at the same time allowing for sensible geological variations.

The present invention can provide seismic data interpreters with an excellent starting point for interpretation: a set of tiles. The invention can also provide them with tools to allow them to display and filter on attributes extracted from the tiles etc. When proceeding to connect the tiles together to form horizons, faults and the like, the information of which tiles a user connects and which labels are put on them can be stored centrally.

When a prospect is defined, e.g. by combining horizons and faults to form a container, this can again be stored. A database of information that captures knowledge of how things interrelate is gradually populated. This can later be used to further improve on the logic to connect tiles, making the front-end tools of even more value to an individual user.

Individual users can label and structure the tiles to achieve a better interpretation for a project they are working on. By combining tiles to produce a tidy and labelled interpretation for their own benefit, users are at the same time adding to a library, so that the automatic methods can be improved.

In the automated seismic interpretation of embodiments of the present invention, tiles are individual elements that are detected or identified first. Having performed the tile detection/identification, logic is applied using the tiles as input. This can be more effective than applying machine learning directly on the seismic data with no prior identification of sub-elements.

Embodiments of the invention can provide a language or "hooks" that can be used to transform rules for identifying geological features, for example, into a form which can be used by machines. A fault cannot change its throw in a random fashion along its length, for example, and thinning and thickening of horizons needs to adhere to some rules.

Embodiments of the invention can provide a tool that checks an existing full interpretation (e.g. of multiple horizons and faults) for consistency, flagging areas where there could be violation of physics. Computers could be used, in an embodiment of the invention, to fill in the details of an interpretation that a human has done on a very coarse grid.

Embodiments of the invention can be used to identify DHIs in seismic datasets, e.g. by detecting potential top reservoir reflections, performing automated AVO analysis on these and identifying tiles that indicate a hydrocarbon contact. This can be extended by connecting tiles to form a complete top reservoir horizon with potential faults or pinchouts that would limit the accumulation, as well as performing a targeted flatspot detection and investigating if its AVO characteristics make geological/physical sense, to return a set of potential DHI prospects that can, for example, be ranked by size. If there are missed DHIs in a portfolio, and some of these can be identified this way, this application of the invention would be very valuable.

Embodiments of the invention can enable a controlled and gradual transition to digitalization of seismic data interpretation in a manner that allows the capturing of the knowledge and know-how found in existing workflows, moving more and more of the interpretation effort over to the computers, but in a sensible and controlled way. They can provide a framework that enables the combination of the geophysical world of attributes measured on a multitude of AVO products, with the geological world of knowing which fault and horizon geometries make sense, with data analytics such as filters, searches, logics, visualization and potentially machine learning. This application could fundamentally change the way we work and probably Embodiments of the invention can result in reduced time from reception of seismic data to completed interpretation, and ensure the interpretation has consistent, high quality.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A method of prospecting for hydrocarbons, comprising:
   (i) modelling a geological structure by analysing seismic data from a geological structure, the modelling of a geological structure comprising:
      determining a set of tiles from a data cube of the seismic data; and then
      determining which tiles of the set of tiles can be grouped into one or more patches of tiles; wherein:
   all of the tiles in the set of tiles have the same size and/or shape; and/or
   there is a regular spacing between the tiles in the set of tiles;
   (ii) determining a possible location of hydrocarbons;
   (iii) using the determined possible location of hydrocarbons in the decision-making process for the drilling of a well; and
   (iv) drilling for hydrocarbons at the determined possible location of hydrocarbons.

2. A method as claimed in claim 1, wherein the data tiles in the set of data tiles are determined by identifying local maxima.

3. A method as claimed in claim 1, wherein determining which tiles of the set of tiles can be grouped regular into one or more patches of tiles comprises applying one or more rules; and/or a patch of tiles comprises two or more tiles which line up with each other; and/or a patch of tiles corresponds to a reflector surface.

4. A method as claimed in claim 1, wherein data defining the one or more patches of tiles is stored in a memory.

5. A method as claimed in claim 4, wherein the data defining the one or more patches of tiles comprises data identifying the set of tiles comprised by each of the one or more patches.

6. A method as claimed in claim 1, further comprising displaying the tiles and/or patches of tiles on a display.

7. A method as claimed in claim 1, further comprising analysing:
  a. at least one tile from the set of tiles; and/or
  b. the one or more patches of tiles;
to identify one or more geological features and/or other features of a geological structure.

8. A method as claimed in claim 7, wherein the geological and/or other features comprise one or more of an unconformity, a pinchout, a flatspot, multiples and/or a fault.

9. A method as claimed in claim 7, wherein the step of analysing at least one tile from the set of tiles and/or the one or more patches of tiles is performed by applying logic and/or using machine learning; and/or one or more patches of tiles are only analysed if they comprise greater than a predetermined number of tiles.

10. A method as claimed in claim 7, further comprising displaying the geological features and/or other features of a geological structure on a display; and/or storing instructions for defining the identified geological features and/or other features of a geological structure from the set of tiles in a memory; and/or determining a possible location of hydrocarbons.

11. A method of modelling a geological structure using seismic data, the method comprising performing the method of claim 1.

12. A method as claimed in claim 1, wherein the method is at least partially performed on a computer or computer system.

13. A method as claimed in claim 1, further comprising performing a seismic survey to obtain the data cube of seismic data.

14. A computer program product for prospecting for hydrocarbons, the computer program product comprising computer readable instructions embedded in a non-transitory medium that, when run on one or more computers, are configured to cause one or more processors to:
  (i) model a geological structure by analysing seismic data from a geological structure, the modelling a geological structure comprising:
    determining a set of tiles from a data cube of the seismic data; and then
    determining which tiles of the set of tiles can be grouped into one or more patches of tiles;
  wherein:
  all of the tiles in the set of tiles have the same size and/or shape; and/or
  there is a regular spacing between the tiles in the set of tiles;
  (ii) determine a possible location of hydrocarbons;
  (iii) use the determined possible location of hydrocarbons in the decision-making process for the drilling of a well; and
  (iv) initiate drilling for hydrocarbons at the determined possible location of hydrocarbons.

15. A system for analysing seismic data from a geological structure, the system comprising one or more software elements embedded in a non-transitory medium that, when run on one or more computers, are configured to cause one or more processors to:
  (i) model a geological structure by analysing seismic data from a geological structure, the modelling a geological structure comprising:
    determining a set of tiles from a data cube of the seismic data; and then
    determining which tiles of the set of tiles can be grouped into one or more patches of tiles;
  wherein:
  all of the tiles in the set of tiles have the same size and/or shape; and/or
  there is a regular spacing between the tiles in the set of tiles;
  (ii) determine a possible location of hydrocarbons;
  (iii) use the determined possible location of hydrocarbons in the decision-making process for the drilling of a well; and
  (iv) initiate drilling for hydrocarbons at the determined possible location of hydrocarbons.

16. A system as claimed in claim 15, the system comprising:
  a tile generator for determining the set of tiles from a data cube of seismic data; and/or
  an object generator for determining which tiles of the set of tiles can be grouped into one or more patches of tiles; and/or
  a control unit; and/or
  one or more libraries; and/or
  one or more user interfaces.

* * * * *